US012597770B2

(12) United States Patent
Nerad

(10) Patent No.: US 12,597,770 B2
(45) Date of Patent: Apr. 7, 2026

(54) VOLTAGE LIMITER FOR ELECTROSTATIC SIGNAL RECEIVER

(71) Applicant: EM Microelectronic-Marin SA, Marin (CH)

(72) Inventor: Jiri Nerad, Prague (CZ)

(73) Assignee: EM Microelectronic-Marin SA, Marin (CH)

( * ) Notice: Subject to any disclaimer, the term of this patent is extended or adjusted under 35 U.S.C. 154(b) by 338 days.

(21) Appl. No.: 18/302,233

(22) Filed: Apr. 18, 2023

(65) Prior Publication Data

US 2024/0014647 A1      Jan. 11, 2024

(30) Foreign Application Priority Data

Jul. 5, 2022    (EP) .................................... 22182977

(51) Int. Cl.
    *H02H 9/04*              (2006.01)
(52) U.S. Cl.
    CPC .................................... *H02H 9/04* (2013.01)
(58) Field of Classification Search
    CPC ...... H02H 9/04; H10D 89/611; H10D 89/931; H03K 19/00315
    See application file for complete search history.

(56) References Cited

U.S. PATENT DOCUMENTS

| | | | | |
|---|---|---|---|---|
| 2,240,289 A | * | 4/1941 | Dillenburger .......... | H04N 5/148 |
| | | | | 348/E5.068 |
| 2,434,155 A | * | 1/1948 | Haynes .................... | H03G 7/02 |
| | | | | 323/364 |

| | | | | |
|---|---|---|---|---|
| 2,581,124 A | * | 1/1952 | West ...................... | G06G 7/163 |
| | | | | 708/845 |
| 2,813,987 A | * | 11/1957 | Taylor ................ | G05B 19/4105 |
| | | | | 307/155 |
| 3,569,958 A | * | 3/1971 | Gabriel ..................... | G06J 1/00 |
| | | | | 708/4 |
| 3,665,460 A | * | 5/1972 | Murakami ............. | H03K 17/74 |
| | | | | 341/138 |
| 4,390,834 A | * | 6/1983 | Ohshita .................. | H03G 3/001 |
| | | | | 377/45 |
| 4,468,607 A | * | 8/1984 | Tanaka ..................... | H03H 7/24 |
| | | | | 455/249.1 |
| 4,763,184 A | | 8/1988 | Krieger et al. | |
| 4,930,036 A | | 5/1990 | Sitch | |

(Continued)

OTHER PUBLICATIONS

European Search Report of EP 22 18 2977 dated Dec. 14, 2022.

*Primary Examiner* — Thienvu V Tran
*Assistant Examiner* — Muaamar Qahtan Al-Taweel
(74) *Attorney, Agent, or Firm* — Sughrue Mion, PLLC

(57)              ABSTRACT

A voltage limiter for a signal receiver (1), the voltage limiter (20) including: an input (21) connectable to a signal source (10); an output (22) connectable to a detector (70) and connected to the input (21) via a signal conductor (30); a ground conductor (40) connectable to ground (5); a first branch (24) connected to the signal conductor (30), connected to the ground conductor (40) and comprising a first diode element (52); a second branch (25) connected to the signal conductor (30), connected to the ground conductor (40) and comprising a second diode element (53); and a resistor element (36, 54, 55) between the signal conductor (30) and the ground conductor (40).

17 Claims, 4 Drawing Sheets

(56) References Cited

U.S. PATENT DOCUMENTS

| 5,561,373 | A | * | 10/1996 | Itoh | .......................... | H01L 22/14 |
| | | | | | | 257/E21.531 |
| 10,498,136 | B2 | * | 12/2019 | Chen | .................... | H02H 1/0007 |
| 2008/0013231 | A1 | | 1/2008 | Bazzano et al. | | |

* cited by examiner

1

VOLTAGE LIMITER FOR ELECTROSTATIC SIGNAL RECEIVER

CROSS REFERENCE TO RELATED APPLICATIONS

This application claims priority to European Patent Application No. 22182977.3, filed on Jul. 5, 2022, the entire contents of which are incorporated herein by reference.

TECHNICAL FIELD

The present invention relates to voltage limiter for a signal receiver and in particular to a voltage limiter for an electrostatic signal receiver. In a further aspect the disclosure relates to a signal receiver, in particular to an electrostatic signal receiver and to a method of tuning a voltage limiter for a signal receiver.

BACKGROUND OF THE INVENTION

With position detection devices that are formed of a tablet device and an active stylus, the stylus may be configured to receive a control signal transmitted from the tablet. Here, the tablet may be regarded as an electrostatic signal source. The signal source can be modeled as a series or combination of a voltage source and a capacitor.

With such architectures the signal source does not define a static operation point for the extreme, i.e. minimum or maximum values of the instantaneous signal voltage. Besides, undesired interference signal sources may be present between the signal source, i.e. the transmitter and the receiver.

For electrostatic signal reception a voltage limiter is typically included in a signal input port in order to define or to restore a static operating point and voltage limits of the instantaneous voltage swing. This helps to ensure a proper operation of input stages of a digital demodulator. The voltage limiter should prevent undesired interfering signals from overdriving the front stages of the digital demodulator or receiver.

Many systems for electrostatic signal reception use a simple implementation of a voltage limiter effectively consisting of anti-parallel connection of two diode elements whilst assuming that the static operating point will be at the center or origin of its characteristic and that the circuit will operate around this center point.

Such a characteristic curve is schematically illustrated in FIG. 2. There, with the characteristic graph 100 a current through the voltage limiter is illustrated versus a voltage applied. The voltage limiter features a working range 102. At a minimum voltage the characteristic curve 100 features a knee voltage region 106. With a voltage applied across the voltage limiter smaller than a lower knee voltage 106 there will arise a negative current. In the opposite direction and when a voltage larger than an upper knee 104 is applied the current through the voltage limiter will promptly increase in a positive sense.

Accordingly, such known voltage limiters exhibit the following drawbacks when coupled to an electrostatic or capacitive signal source. Due to leakage currents the static or quiescent operating point of the voltage limiter will be near one of the knee points 106, 104. When a period of a weak signal or no signal is followed by a fast arrival of strong signals, the periodic steady-state is not established and one half period or polarity of the useful signal waveform may be subject to temporary compression or distortion until the input circuit reaches the steady-state condition. Furthermore, and when the useful signal swing or interference signal swing reaches the knee points 106, 104 of the limiter characteristics, the useful signal may be subject to permanently repeating compression or distortion that is present during part of every half cycle of the useful signal or interference signal.

These fundamental drawbacks are due to the use of a capacitive signal source in combination with a fixed characteristic of the voltage limiter.

It is hence desirable to provide an improved voltage limiter for a signal receiver, in particular for a capacitive or an electrostatic signal source. Here, signal distortion should be avoided or reduced by optimizing the shape of the limiter characteristic. Moreover, the voltage limiter should be easily adaptable and/or tunable to varying properties of the electrostatic or capacitive signal source. Moreover, the voltage limiter should provide an improved characteristic curve to pass the full bandwidth with minimum distortion. The voltage limiter should exhibit a rather simple structure, very low power dissipation and should be optimizable for low distortion while offering an adaptive operation.

SUMMARY OF THE INVENTION

The object of the present invention will be solved by a voltage limiter, by a signal receiver and by a method of tuning a voltage limiter according to the features of the independent claims. Preferred embodiments are subject matter of the dependent claims, respectively.

In one aspect there is provided a voltage limiter for a signal receiver, in particular for an electrostatic signal receiver. The voltage limiter comprises an input connectable to a signal source, e.g. a capacitive or electrostatic signal source. The voltage limiter further comprises an output connectable to a detector, such as a digital demodulator. The output is connected to input via a signal conductor. The voltage limiter further comprises a ground conductor connectable to ground.

The voltage limiter further comprises a first branch connected to the signal conductor, connected to the ground conductor and comprising a first diode element. The voltage limiter further comprises a second branch connected to the signal conductor, connected to the ground conductor and comprising a second diode element. The voltage limiter further comprises a resistor element between the signal conductor and the ground conductor.

By way of the resistor element an effect of a leakage current on the voltage limiter can be minimized. This way, it can be ensured that the quiescent operating point of the voltage limiter is or remains near the origin of the limiter characteristic for small but nonzero current via the limiter.

With some examples the resistor element is arranged in a zero-order branch, which is parallel to the first branch and parallel to the second branch. With other examples the resistor element may be arranged in one of the first and the second branches. When the resistor element is e.g. located in the first branch also the second branch may comprise a similar or an identical resistor element. With a resistor element in any of the first and the second branches the slope of the limiter characteristic for voltage ranges or segments, where the respective first and second diodes are conductive can be adjusted.

In particular, the slopes near or beyond the knee voltage regions can be precisely adjusted by selecting and using a resistor element of appropriate size or resistance in the first branch and/or in the second branch.

According to a further example the first diode element and the second diode element are arranged in the first branch and in the second branch with opposite polarity. Typically, an anode of the first diode element is connected to the signal conductor. A cathode of the first diode element is connected to the ground conductor. The cathode of the second diode element is connected to the signal conductor and an anode of the second diode element is connected to the ground conductor. Typically, the first and the second branches are parallel to each other. The first and the second diode elements are anti-parallel with respect to each other.

According to a further example one of the first branch and the second branch comprises the resistor element or another resistor element in series with the first diode element or second diode element. Here, the voltage limiter may comprise at least two separate resistor elements.

A zero-order resistor element may be arranged in a zero-order branch, e.g. connecting the signal conductor and the ground conductor. The another resistor element, hence a second resistor element may be then arranged in series with the first diode element or second diode element. It may be therefore arranged in one of the first branch and the second branch. By way of at least two resistor elements, e.g. with a zero-order resistor element in the zero-order branch the effect of a leakage current of the voltage limiter can be minimized. By way of the another resistor element in series with one of the first diode element and the second diode element the slope of the limiter characteristic near at least one of an upper and a lower knee point can be adjusted.

Here and in this way the voltage limiter can be adapted and tuned to the characteristic signals of the signal source.

According to a further example of the voltage limiter the first branch comprises a first resistor element in series with the first diode element. The second branch comprises a second resistor element in series with the second diode element. By providing both, the first branch and the second branch with a separate resistor element in series with the respective first or second diode element both, an upper knee voltage region as well as a lower knee voltage region can be adjusted with regards to the slope of the characteristic curve of the voltage limiter.

With this implementation and according to another example the voltage limiter may be void of a zero-order branch. Hence, the signal conductor of the voltage limiter and the ground conductor may be exclusively connected via the first branch and the second branch parallel to the first branch. There may be provided further branches, e.g. third, fourth, fifth and sixth branches, each of which comprising a structure corresponding or comparable to the structure of the first branch and the second branch, respectively. Hence, every branch interconnecting the signal conductor and the ground conductor comprises at least a diode element and optionally a resistor element. With such implementations of the voltage limiter the slopes of the limiter characteristic near the upper and lower knee voltage regions can be adjusted accordingly.

According to a further example of the voltage limiter one of the first branch and the second branch comprises a voltage source in series with the first diode element or second diode element. With a voltage source in any of the first branch and the second branch the position of the knee region or knee point can be shifted. Hence, the working point or working range of the voltage limiter can be tuned or shifted to a predefined value or magnitude of the voltage of the signal source.

According to a further example the first branch comprises a first voltage source in series with the first diode element and the second branch comprises a second voltage source in series with the second diode element. By way of the voltage sources in the first and the second branches the upper and the lower voltage knee points or knee regions can be shifted and tuned in accordance with the voltage provided by the first and second voltage sources.

Typically, the voltage sources in the first and second branches are oriented anti-parallel to each other. With some examples the anode of the first voltage source is connected to the signal conductor and the cathode of the first voltage source is connected to the ground conductor. The anode of the second voltage source arranged in the second branch is connected to the ground conductor and the cathode of the second voltage source is connected to the signal conductor.

With some examples and when the first branch comprises a diode element, a resistor element and a voltage source the diode element may be located between the voltage source and the resistor element. The same may apply to the second branch when the second branch is equipped with the second diode element, the second resistor element and the second voltage source. Hence, the second diode element may be sandwiched between the second voltage source and the second resistor element.

According to a further example the first voltage source and the second voltage source are of opposite polarity. Here, the cathode of the first diode element may be connected to the anode of the first voltage source. The anode of the first diode element may be connected to the first resistor element. With the second branch, an anti-parallel configuration may be provided. There, the anode of the second diode element may be connected to the second resistor element and the anode of the second diode element may be connected to the cathode of the second voltage source.

According to a further example the first branch and the second branch constitute a branch assembly. Typically, the first branch and the second branch form a pair of branches or a couple of branches. The branch assembly may consist of the first branch and the second branch. The voltage limiter may be equipped with numerous branch assemblies. Hence, the voltage limiter may comprise a first branch assembly, comprising a first branch and a second branch and may further comprise a second branch assembly comprising or constituting a third branch and a fourth branch. The third branch and the fourth branch are parallel to each other. They may be also parallel to the first branch and to the second branch, respectively.

With a branch assembly the first diode element and the second diode element are of equal type. The first resistor element and the second resistor element are effectively of equal resistance and/or the first voltage source and the second voltage source are configured to provide a voltage of opposite sign and equal magnitude. In other words, the individual branches of a branch assembly are rather symmetric and/or anti-parallel.

With some examples the voltage limiter is expanded to a large number of branches, e.g. constituting a respective number of pairs of branches each denoted as a branch assembly. Within each branch assembly the diode elements of the two individual branches may be of equal type, the resistor element of the two branches of a branch assembly are of equal type and are of substantially equal resistance and the voltage sources, if present, are configured to provide a voltage of equal magnitude but opposite polarity.

In this way the voltage limiter can be easily expanded or extended by a branch assembly and hence by a pair of a first and a second branches. The first branch of a branch assembly serves to modify or to tune a lower knee point of the characteristic of the voltage limiter and the second branch serves to tune or to modify the upper knee point of the characteristic of the voltage limiter.

According to another example the voltage limiter comprises a third branch connected to the signal conductor, connected to the ground conductor and comprising a third diode element. Typically, the third branch may comprise the same structure compared to any of the first branch and the second branch. By way of a third branch parallel to the first branch or second branch the slopes of the knee point or knee voltage region can be tuned even better and more precise.

According to a further example the voltage limiter further comprises a fourth branch connected to the signal conductor, connected to the ground conductor and comprising a fourth diode element. Like the third branch, the fourth branch expands the functionality and the tunability of the voltage limiter. Typically, the third diode element and the fourth diode element are of equal type.

Typically, the third branch and the fourth branch form or constitute a second branch assembly, which is arranged parallel to the first branch assembly. The individual branches of the second branch assembly, hence the third branch and the fourth branch may comprise the same or a corresponding structure compared to the first branch and/or the second branch.

According to a further example at least one of the third branch and the fourth branch comprises a third resistor element in series with the third diode element or fourth diode element. With further examples each one of the third branch and the fourth branch comprises an individual resistor element. Here, the third branch may comprise a third resistor element in series with the third diode element and the fourth branch comprises a fourth resistor element in series with the fourth diode element The behavior or characteristics of the first and the second diode elements, i.e. the diode element of the first branch assembly may be substantially equal. The same may apply to the third diode element and the fourth diode element. However, the first diode element may differ from the third diode element. Likewise, the second diode element may differ from the third and/or from the fourth diode element. By using different types of diode elements or diode elements with different characteristics the overall characteristics of the first and the second branch assemblies can be modified and tuned accordingly.

According to a further example at least one of the third branch and the fourth branch comprises a third voltage source in series with the third diode element or fourth diode element. With some examples each one of the third branch and the fourth branch comprises a voltage source. Typically, the third branch comprises a third voltage source and the fourth branch comprises a fourth voltage source. Typically and as described above in connection with first and second voltage sources of first and second branches also the third and fourth voltage sources are of opposite polarity. Insofar all features and effects as described above with the first branch equally apply to the third branch. All features, effects and benefits as described above with regards to the second branch may equally apply to the fourth branch; and vice versa.

According to a further example the voltage limiter comprises a zero-order branch connected to the signal conductor and connected to the ground conductor. The zero-order branch may comprise the resistor element as described above. The zero-order branch may be void of a voltage source and/or may be void of a diode element. The zero-order branch and the respective resistor element may provide to attenuate or to minimize the effect of a leakage current to ensure that a quiescent operating point of the voltage limiter is and remains near the origin of the limiter characteristic for small but nonzero currents via the limiter.

According to a further example at least one of the branches comprises a switch. The switch is operable to selectively electrically disrupt or break an electrical conductivity of the respective branch. Each branch interconnects the ground conductor and the signal conductor. By way of an open switch, the electrical conductivity between the ground conductor and the signal conductor provided by the respective branch can be interrupted or broken. With a closed switch the ground conductor and the signal conductor are interconnected by the respective branch comprising the switch. Then, the respective branch becomes active and contributes to the overall characteristic of the voltage limiter.

Typically, the voltage limiter can be equipped or provided with numerous branches, each of which comprising a switch in order to deactivate or to activate a respective branch. By way of a switch in any of the available branches the voltage limiter can be easily adjusted and tuned to varying demands and to a desired characteristic behavior.

The at least one switch or the numerous switches can be operated or activated upon deployment of the voltage limiter, i.e. when the voltage limiter is installed in a signal receiver. By selecting or deselecting, hence by closing and/or opening the numerous switches the voltage limiter can be calibrated and tuned on-demand.

Operating or actuating of the switches can be provided by a controller and/or by a control loop. The controller and/or the control loop may comprise a signal analyzer connected to the output of the voltage limiter. By way of analyzing the output or output signal of the voltage limiter the controller may select or determine a configuration by way of which there is provided a desirable response of the voltage limiter for a given input signal. A configuration of switches and an associated characteristic of the voltage limiter may be stored in an electronic memory, e.g. in form of a translation table or lookup table. A desirable switch configuration may be obtained or decided by simulations or by conducting numerous performance measurements with the voltage limiter.

According to a further aspect the present disclosure also relates to a signal receiver, typically to a capacitive or electrostatic signal receiver. The signal receiver comprises a signal input, which is driven by a capacitive signal source. The signal receiver further comprises a voltage limiter as described above, wherein the input of the voltage limiter is connected to the signal source. The signal source is typically implemented as a capacitive or as an electrostatic signal source. The signal receiver further comprises a detector connected to the output of the voltage limiter. The detector may be particularly implemented as a digital demodulator.

Since the signal receiver comprises a voltage limiter as described above, any features, effects and benefits described above in connection with the voltage limiter equally apply to the signal receiver; and vice versa.

According to a further example the signal receiver comprises a voltage limiter wherein at least one of the branches of the voltage limiter comprises a switch operable to selectively electrically disrupt or break an electrical conductivity of the respective branch. Typically, the signal receiver comprises an adaptive or tunable voltage limiter, which is tunable by selecting and/or deselecting a number of switches of numerous branches of the voltage limiter, thereby activating or deactivating respective branches of the voltage limiter in accordance to a desired operating characteristics of the voltage limiter.

The signal receiver further comprises a signal analyzer connected to the output and comprises a controller connected to the signal analyzer and connected to the at least one switch. The controller is operable to actuate or to operate the at least one switch and/or all available switches depending on an output of the signal analyzer. With some examples the controller may be equipped with a translation table or lookup table. Depending on the signal obtained from the signal analyzer the controller may select a switch configuration and may be operable to deploy the switch configuration with the voltage limiter so as to optimize the output of the voltage limiter in response to the input signal present to the voltage limiter.

According to another aspect the present disclosure further relates to a method of tuning a voltage limiter for a signal receiver. Typically, the method is implementable by a voltage limiter and/or by a signal receiver as described above. Insofar, all features, effects and benefits as described above in connection with the voltage limiter and the signal receiver also apply to the method of tuning the voltage limiter for the signal receiver.

The method comprises the steps of providing a voltage limiter, e.g. a voltage limiter as described above and applying an input signal to the input of the voltage limiter. As a further step an output signal is analyzed at the output of the voltage limiter, which output signal is induced by the input signal. Hence, the output signal is a response of voltage limiter when provided with the input signal. On the basis of the analysis of the output signal at least one branch of the voltage limiter is selected or deselected.

Accordingly and thereafter, a conductivity of a deselected branch is disrupted and a conductivity of a selected branch is provided.

In addition or alternative to the disruption or establishing of the conductivity of a deselected or selected branch the resistance of a resistor element of the selected branch may be adjusted. Here, the hardware of the voltage limiter may be modified by exchanging a resistor element by another resistor element having a different resistance. By selecting and implementing a resistor element of a desired resistivity in any of the branches and/or in the zero-order branch the response characteristics of the voltage limiter can be adjusted accordingly and the voltage limiter can be tuned.

BRIEF DESCRIPTION OF THE DRAWINGS

In the following, some examples of a voltage limiter for an electrostatic signal receiver are illustrated in greater detail by making reference to the drawings, in which.

DETAILED DESCRIPTION OF AN EMBODIMENT OF THE INVENTION

Figure 1:
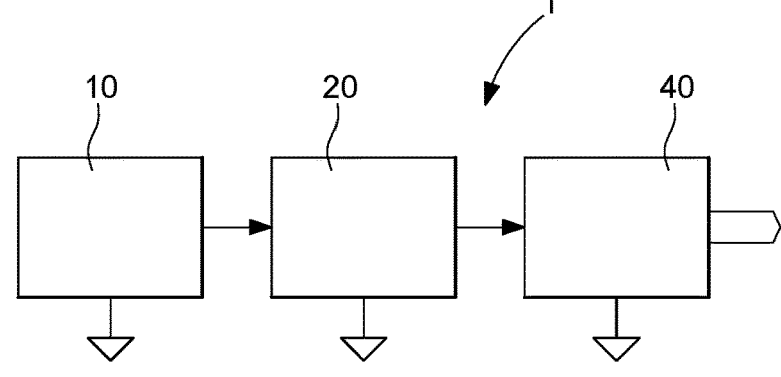
FIG. 1 shows a block diagram of a signal receiver comprising a voltage limiter.
Figure 3:
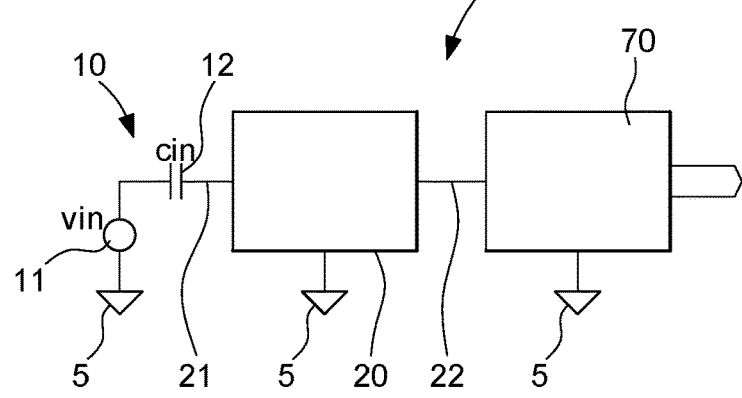
FIG. 3 shows a further block diagram of an example of a signal receiver.
Figure 4:
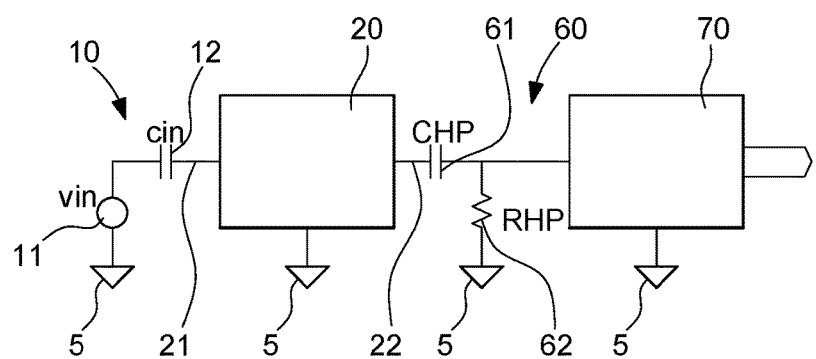
FIG. 4 shows another example of a signal receiver.

In FIGS. 1, 3 and 4, a signal receiver 1 is schematically illustrated. The signal receiver 1 is configured to receive and to process a capacitive or electrostatic signal from a transmitter. The signal receiver 1 is typically driven by a capacitive signal source 10. In FIGS. 3 and 4 the capacitive signal source 10 comprises an input voltage 11 coupled with an input capacitor 12. The capacitor 12 and the input voltage 11 are in series. The output of the capacitive signal source 10 is connected to the input 21 of a voltage limiter 20. An output 22 of the voltage limiter 20 is connected to a signal detector 70. The signal detector 70 may be implemented as a digital demodulator. The signal source 10 does not define a static operating point on the extreme, hence the minimum or maximum values of an instantaneous signal voltage. For this, the voltage limiter 20 is provided in order to define and/or to restore a static operating point and to limit the instantaneous voltage swing as provided by the signal source 10 in order to ensure a proper operation of the input stage of the detector or demodulator 70.

With the example of FIG. 3 the detector 70 is implemented as a rising and/or falling edge detector. With the example of FIG. 4 there is provided a high-pass filter arrangement 60 comprising a capacitor 61 in series with the output 22 and further comprising a resistor 62 one end of which connected to ground 5 and the other end of which connected to a conductor extending from the capacitor 61 to the detector 20. With the example of FIG. 4 the detector can be implemented as a positive and/or negative peak detector.

Both detectors 70 as illustrated in FIGS. 3 and 4 provide a digital output data stream that represents the received signal, i.e. a baseband digital modulation signal from the signal source 10 with or without the presence of a strong low-frequency interference.

Figure 2:
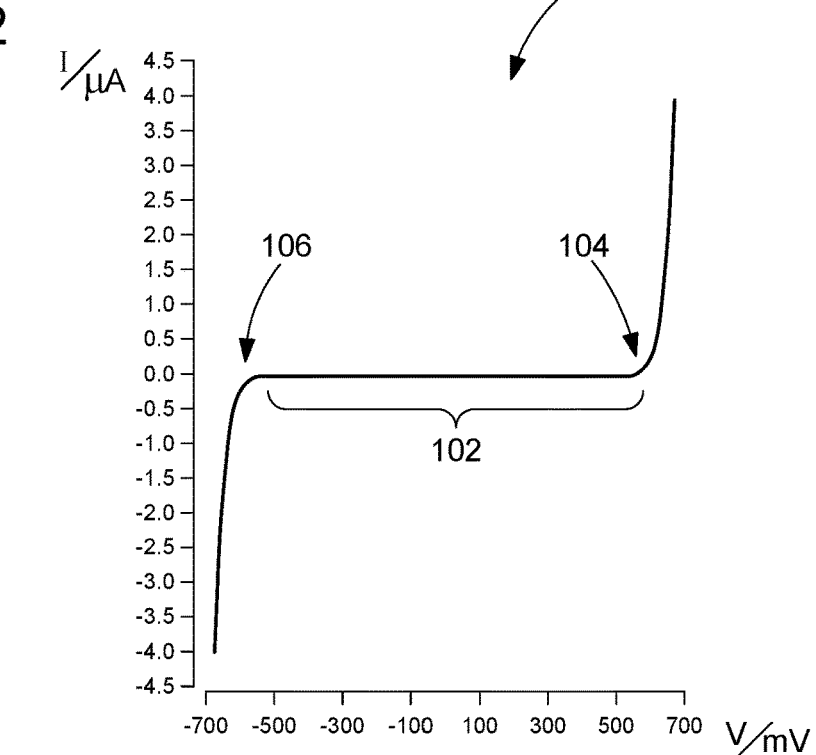
FIG. 2 illustrates a characteristic behavior of the voltage limiter showing a current across the voltage limiter versus a voltage applied across the limiter.

As already described above the voltage limiter 20 located between the signal source 10 and the detector 70 typically exhibits a characteristic 100 as illustrated in FIG. 2. In particular, the voltage limiter 20 aims to minimize or to avoid a degradation of the useful modulation of the input signal.

Figure 5:
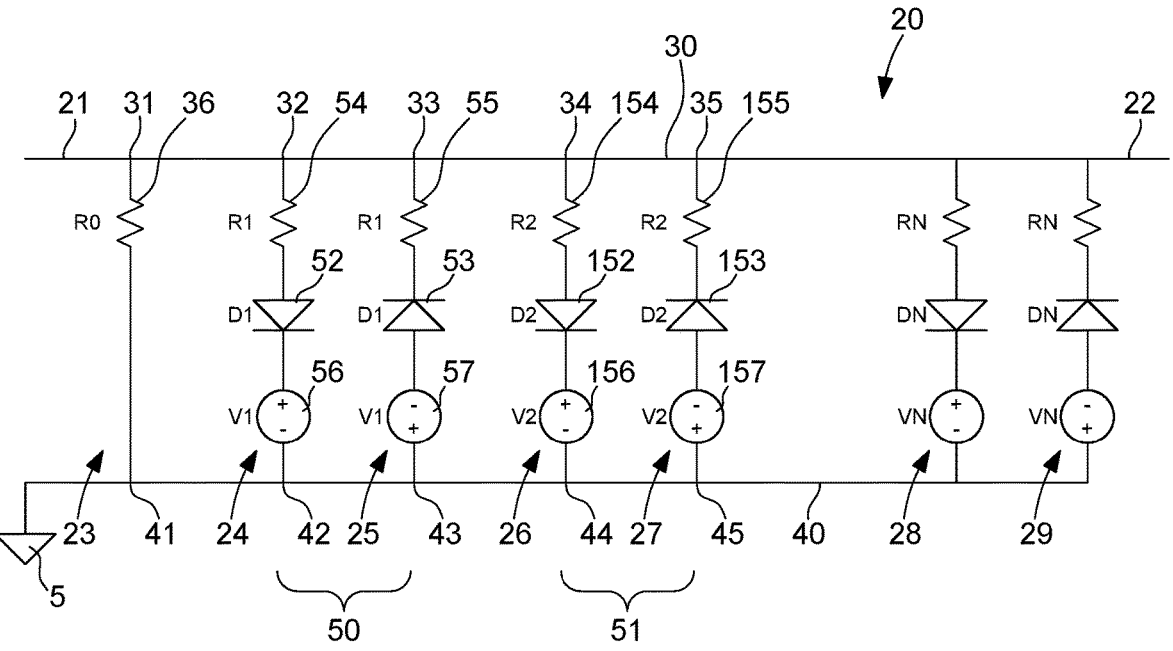
FIG. 5 shows the structure of one example of the voltage limiter.

One example of the voltage limiter 20 is Illustrated in FIG. 5. The voltage limiter 20 comprises an input 21 connected to the output 22 by a signal conductor 30. The voltage limiter 20 further comprises a ground conductor 40 connected to or connectable to ground 5. The voltage limiter 20 further comprises a first branch 24 and a second branch 25. Each branch 24, is equipped or provided with a diode element 52, 53. As illustrated, the first branch 24 comprises a first diode element 52 and the second branch 25 comprises a second diode element 53. Furthermore, the voltage limiter 20 comprises a resistor element 36, 54 and/or 55. There is provided at least one resistor element 36, 54, 55 between the signal conductor 30 and the ground conductor 40. The voltage limiter 20 may optionally comprise a zero-order branch 23, which is equipped or provided with a resistor element 36. The zero-order branch 23 is void of a diode element 52, 53. The zero-order branch 23 is connected to the signal conductor 30 via a node 31 and is further connected to the ground conductor 40 via a node 41.

The first branch 24 is further provided with a first resistor element 54 and the second branch 25 is provided with a second resistor element 55. With each branch 24, 25 there is also provided a separate voltage source 56, 57. In detail, the first branch 24 comprises the first diode element 52, the first resistor 54 and the first voltage source 56. The second branch 25 comprises the second diode element 53, the second resistor element 55 and the second voltage source 57. With each branch 24, 25 the resistor element 54, 55, the diode element 52, 53 and the voltage source 56, 57 are arranged in series. Hence, the first branch 24 terminates in a node 32 by way of which it is electrically connected to the signal conductor 30. An opposite end of the first branch 24 terminates in a node 42 and is connected to the ground conductor The voltage source 56 is provided between the node 42 and the diode element 52. The diode element 52 is provided between the voltage source 56 and the resistor element 54 and the resistor element 54 is provided between the diode element 52 and the node 32.

In the same way also the second branch 25 is interconnected with the signal conductor 30 via a node 33 and is connected to the ground conductor 40 via a node 43. Also here, the second voltage source 57 is located between the node 43 and the second diode element 53. The second diode element 53 is located and connected between the second voltage source 57 and the second resistor element 55. The second resistor element is located between the second diode element 53 and the node 33.

The diode elements 52, 53 are of opposite polarity. Hence, an anode of the first diode element 52 is connected to the first resistor 54. A cathode of the first diode element 52 is connected to an positive terminal of the first voltage source 56. A negative terminal of the first voltage source 56 is connected to the node 42.

With the second branch 25 there is provided an opposite polarity both in terms of the diode element 53 as well as with the voltage source 57. There, a cathode of the second diode element 53 is connected to the resistor element 55 and an anode of the second diode element 53 is connected to a negative terminal of the second voltage source 57. A positive terminal of the second voltage source 57 is connected to the node 43. The zero-order branch 23 is void of a diode element and is also void of a voltage source.

The first branch and the second branch 25 constitute or form a first branch assembly 50 and hence a pair of branches, wherein the first branch 24 of the branch assembly 50 comprises a diode element 52 and a voltage source 56 of a first polarity and wherein the second branch 25 of the same branch assembly 50 comprises a diode element 53 and a voltage source 57 of opposite polarity.

The voltage limiter 20 further comprises a third branch 26 and a fourth branch 27. The third branch 26 and the fourth branch 27 form or constitute a second branch assembly 51. The first branch 24, the second branch 25, the third branch 26 and the fourth branch 27 are parallel to each other. The third branch is connected to the signal conductor 30 by a node. The fourth branch 27 is connected to the signal conductor 30 by a node 34. The third branch 26 comprises a third diode element 152, a third resistor element 154 and a third voltage source 156. The resistor element 154, the diode element 152 and the voltage source 156 are arranged in series. The third branch 26 is connected to the ground conductor 40 via a node 44. The fourth branch 27 is connected to the ground conductor 40 via a node 45. The fourth branch 27 comprises a fourth diode element 153, a fourth resistor 155 and a fourth voltage source 157. The resistor element 155, the diode element 153 and the voltage source 157 are arranged in series.

The implementation of the voltage limiter 20 can be expanded by numerous further branches, e.g. n-branches 28, 29, with n being an integer number greater than 3. There may be typically provided even number of supplemental branches, such as branches 28 and 29 to further expanded the voltage limiter 20. Any parallel branch 24, 25, 26, 27, 28, 29 can represent any physical implementation of a diode characteristic with or without an optional series resistor and an optional series voltage supply.

The primary purpose of the voltage sources 56, 57, 156, 157 is adjusting the positions of the individual knee points or knee voltage regions 104, 106 as illustrated in FIG. 2. The diode elements 52, 53, 152, 153, . . . DN are conductive and resistor element 54, 55, 154, 155, . . . RN contribute to the total conductance of the limiter circuit if and only if the absolute value of the instantaneous voltage on the input 21 exceeds those voltages V1, V2 associated to the individual voltage sources 56, 57, 156, 157 in the respective order.

The purpose of the parallel resistor 36 is to minimize the effect of leakage current in order to ensure that the quiescent operating point of the voltage limiter 20 is near the origin of the limiter characteristic for small but nonzero current via the limiter.

The purpose of the series resistors, hence the resistors 54, 55, 154, 155 of the individual branches 24, 25, 26, 27 is adjusting the slopes of the limiter characteristic for the voltage ranges or segments where the respective diode elements 52, 53, 152, 153 are conductive.

Figure 6:
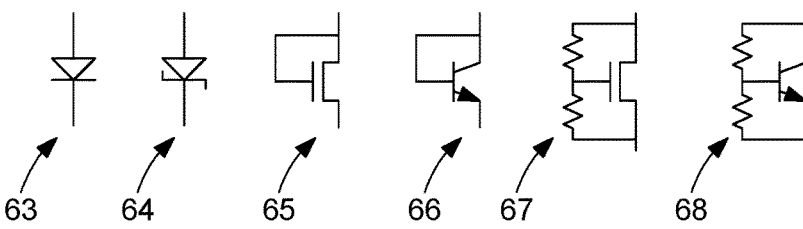
FIG. 6 illustrates numerous implementations of the diode element to be used with the voltage limiter.

The diode elements 52, 53, 152, 153 can be implemented in a variety of different ways. In FIG. 6 numerous possible implementations of such diode elements are schematically illustrated.

The diode element 63 could be implemented as a junction diode with a PN transition. The diode element 64 may be implemented as a Schottky diode.

The diode element 65 may be implemented as a diode connected unipolar transistor (MOS) with standard threshold voltage (VT). It may be implemented as a diode connected unipolar transistor (MOS) with low threshold voltage (VT) or as a diode connected unipolar transistor (MOS) with high threshold voltage (VT).

The diode element 66 may be implemented as a Diode connected bipolar transistor (BJT).

The diode element 67 may be implemented as a Unipolar transistor (MOS) with multiplication of threshold voltage (VT) and the diode element 68 may be implemented as a Bipolar transistor (BJT) with multiplication of base emitter voltage (VBE).

Different types of diodes 63, 64, 65, 66, 67, 68 could provide different characteristics of the individual branches 24, 25, 26, 27. In effect, any of the diode elements 52, 53, 152, 153, DN and as illustrated in FIG. 5 can be implemented by any of the diode elements 63, 64, 65, 66, 67, 68 as illustrated in FIG. 6.

Figure 7:
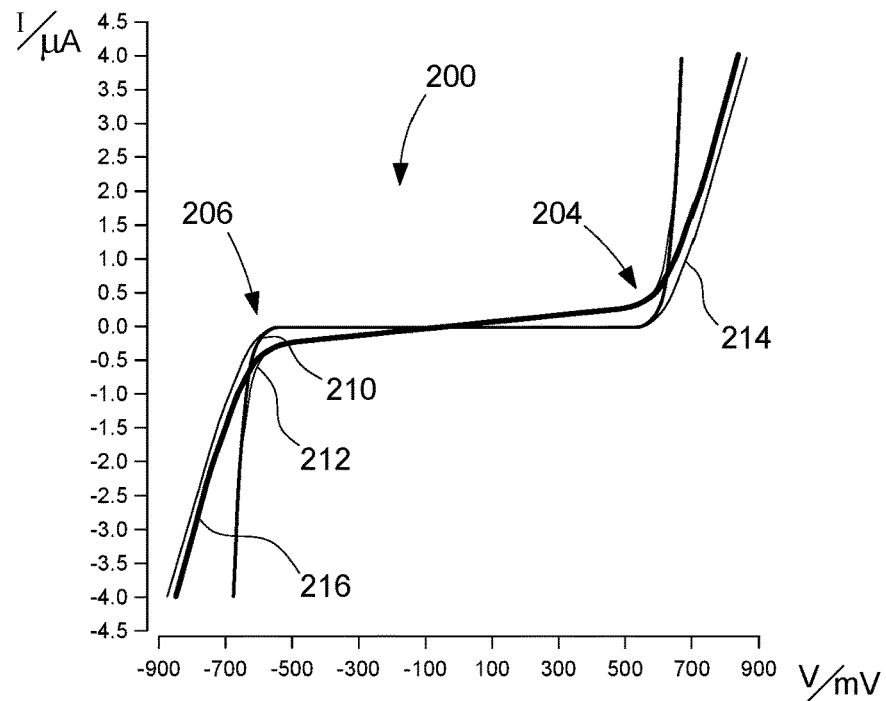
FIG. 7 shows numerous characteristics and respective current versus voltage diagrams for different configurations of the voltage limiter.

In the graph 200 as illustrated in FIG. 7 different characteristics of a number of different implementations of the voltage limiter 20 are schematically illustrated. The characteristic curve 210 with a lower knee point 206 and an upper knee point 204 is provided as a comparative example, wherein the first branch 24 and the second branch 25 are void of a resistor element and are also void of a voltage source.

Compared to this, the characteristic curve 212 evolves with a resistor 36 of 2 megohms. The characteristic curve 214 develops with the first branch 24 and the second branch 25 provided with a first and a second resistor element 54, 55 each of which is 50 kiloohms while the resistor element 36 and hence the zero-order branch 23 is absent or disconnected.

The further characteristic curve 216 is illustrative of a configuration of the voltage limiter 20, wherein the zero-order resistor element 36 comprises 2 megohms while the first and second resistor elements 54, 55 each comprise 50 kiloohms.

Generally, and to minimize a distortion of a useful modulation the slope of the characteristic curves 210, 212, 214, 216 could be kept small and the knee points 204, 206 of the characteristic curves can be designed rather smooth but not sharp. What ultimately matters is the complete characteristic, that is, the combination of all parameters, and the resistivity of the resistor element 36, 54, 55, 154, 155, . . . , RN and the voltage of the voltage sources 56, 57, 156, 157, . . . VN.

What further matters in particular is the performance of the full receiver system for selected modulation type and the expected amplitude and frequency range of the interference signal present at the input 21. For each application scenario of the voltage limiter 20 and for each case of use the voltage limiter 20 can be designed and optimized individually.

Figure 8:
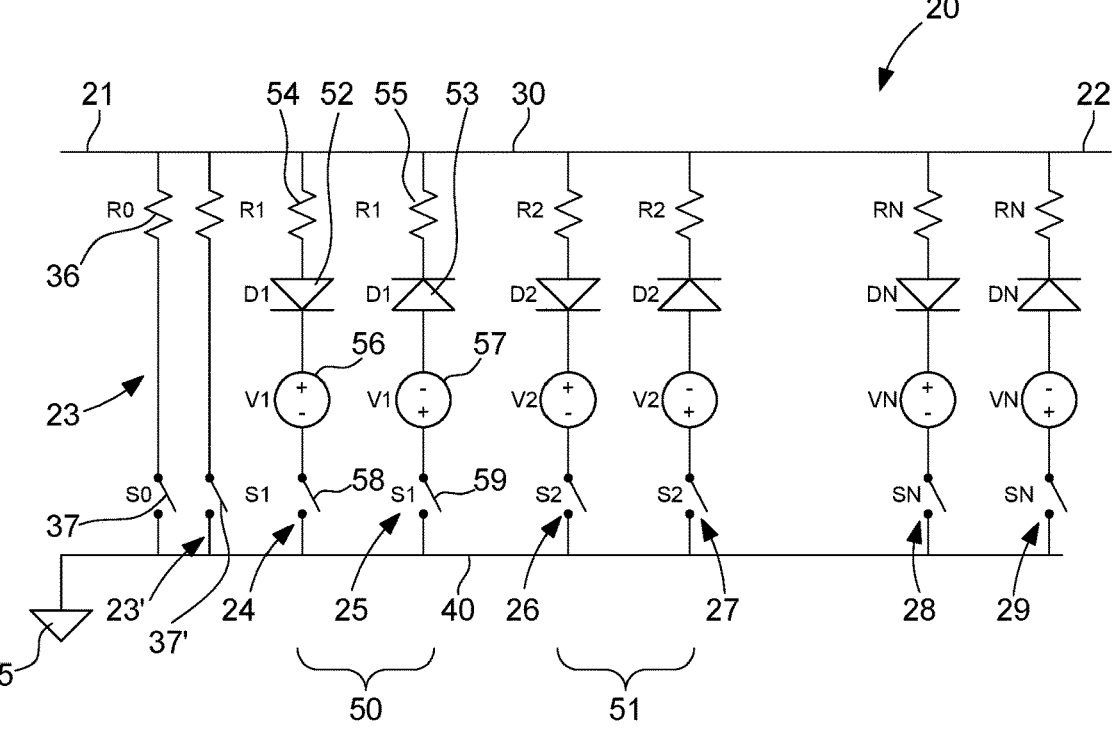
FIG. 8 shows another example of a voltage limiter.

With many wireless transmission systems, the received signal strength can vary, requiring different parameters of limiter characteristics for different values of signal strength. Many circuit techniques for evaluating input signal strength that are available in typical receiver systems include methods for automatic gain control or receive input signal strength indication. There is no system or method available that provides an adaptive characteristic of an input voltage limiter so far. In order to solve this problem, the further implementation of the voltage limiter 20 as illustrated in FIG. 8 is provided with a switch 37, 58, 59 in each of the numerous branches 23, 24, 25, 26, 27, 28, 29. By way of the switches 37, 58, 59, . . . , each branch 23, 24, 25 can be selectively switched on and switch off. In this way, the overall behavior and characteristics of the voltage limiter 20 can be dynamically adapted by a suitable configuration of the switches.

Figure 9:
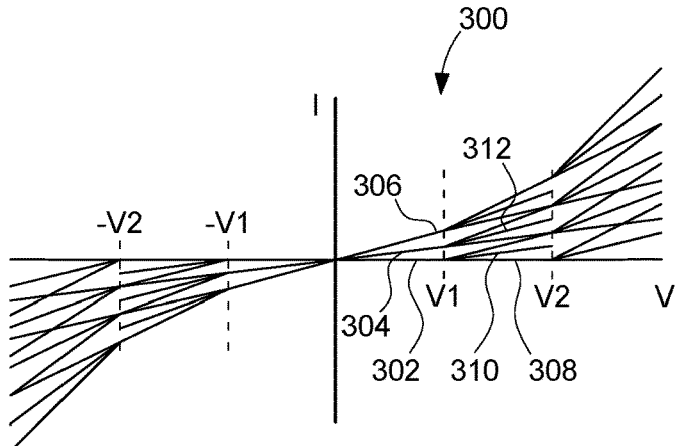
FIG. 9 shows a current versus voltage characteristic diagram for numerous discrete configurations of the voltage limiter according to FIG. 8.

Depending on the state of individual switches, the limiter characteristic can have not only variable number of knee points or threshold voltages but also have a variable number of slopes of each individual segment between the new points or threshold voltages as illustrated in FIG. 9.

In FIG. 9 the numerous selected points of the characteristic curve 300 are obtained by a specific switch configuration For instance, points 302 and 308 are obtained with all switches 37, 58, 59 in an open and hence non-connecting configuration. Point 304 is obtained by closing switch 37. Point 306 is obtained by closing both switches 37, 37' and keeping all other switches open.

Point 310 is obtained when switches 37 and 37' are open while closing both switches 58 or 59. Point 312 is obtained by closing both switches 58 and 59 and closing one of the switches 37, 37'.

In a like manner different slopes can be provided in individual segments as illustrated in FIG. 9 by appropriately selecting or configuring a particular switch configuration.

Figure 10:
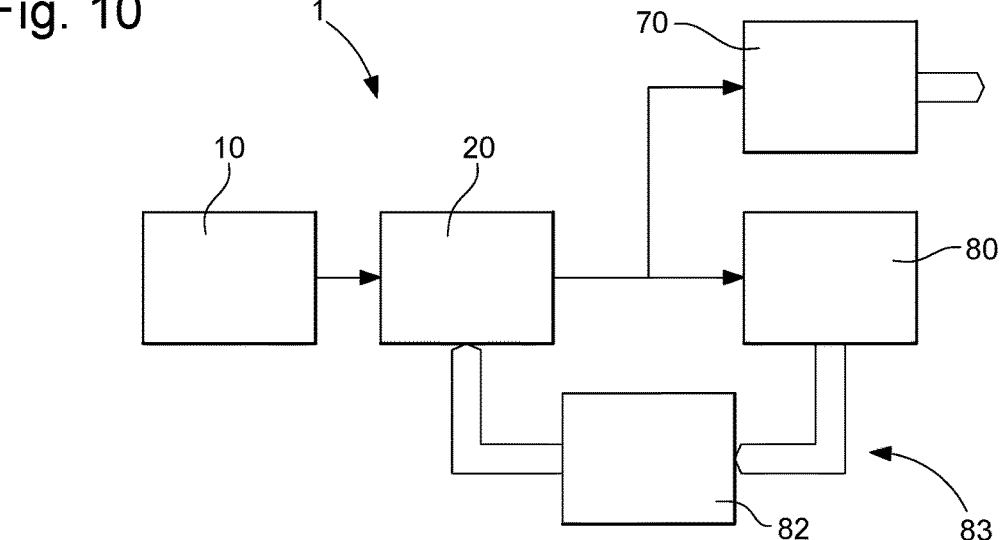
FIG. 10 shows a block diagram of a signal receiver comprising a voltage limiter according to FIG. 8.

In order to dynamically adapt the behavior and the voltage limiter characteristic the control signal for the individual switches 37, 37', 58, 59 may be provided by a controller 82 as illustrated in the block diagram of FIG. 10. The controller 82 is connected to a signal analyzer 80 forming a control loop 83 for the voltage limiter 20. Hence, the output 22 of the voltage limiter 20 is connected to the signal analyzer 80. Signal analysis reveals or provides a suitable selection or configuration of individual switches by the controller 82, which is then operable to select and/or to deselect individual branches 23, 24, 25, 26, 27 by closing or opening respective switches 37, 37', 58, 59 and so on.

The dependency of the complete switch control on the signal strength indication has to be optimized for each combination of modulation type and dynamic range. Consequently, the adaptive control system or the adaptive control algorithm includes some form of a translation from the signal strength indicated by the signal analyzer 80 and hence from the signal strength of the output 22 of the voltage limiter 20 to the controller 82 that sets the characteristic of the dynamically adaptable voltage limiter 20, e.g. by closing and/or opening selective switches 37, 37', 58, 59.

Figure 11:
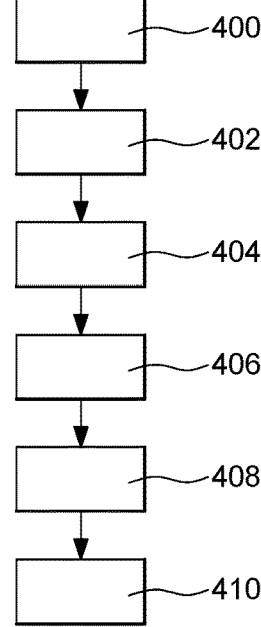
FIG. 11 shows a flowchart of a method of tuning a voltage limiter.

Accordingly, and as further illustrated by the flowchart of FIG. 11 the method of tuning a voltage limiter 20 for or of a signal receiver 1 comprises numerous sequential steps. In a first step 400 a voltage limiter 1 as described above is provided. In a subsequent step 402 an input signal is provided to the input 21 of the voltage limiter 20. Thereafter and in step 404 an output signal at the output 22 of the voltage limiter 20, which has been induced by the input signal is analyzed. In the subsequent step 406 at least one branch 23, 24, 25, 26 or 27 of the voltage limiter 20 is selected or deselected on the basis of the analysis of the output signal as provided in step 404.

In step 408 a conductivity of a deselected branch is disrupted, e.g. by opening of a respective switch. Optionally or alternatively, a conductivity of a selected branch is established in step 410, e.g. by closing a respective switch.

Selecting or deselecting of an individual branch on the basis of the analysis of the output signal can be provided by a translation table or by a lookup table as stored in a memory of the controller 82. Such a translation table or lookup table can be provided by a calibration of the voltage limiter in the course of its manufacturing.

REFERENCE NUMBERS 1 signal receiver
5 ground
10 signal source
11 input voltage
12 input capacitor
20 voltage limiter
21 input
22 output
23 branch
24 branch
25 branch
26 branch
27 branch
28 branch
29 branch
30 signal conductor
31 node
32 node
33 node
34 node
35 node
37 switch
40 signal conductor
41 node
42 node
43 node

44 node
45 node
50 branch assembly
51 branch assembly
52 diode element
53 diode element
54 resistor element
55 resistor element
56 voltage source
57 voltage source
58 switch
59 switch
60 high-pass filter arrangement
61 capacitor
62 resistor
63 diode element
64 diode element
65 diode element
66 diode element
67 diode element
68 diode element
70 detector
80 signal analyzer
82 controller
152 diode element
153 diode element
154 resistor element
155 resistor element
156 voltage source
157 voltage source

The invention claimed is:

1. A voltage limiter for a signal receiver, the voltage limiter comprising:

an input connectable to a signal source, an output connectable to a detector and connected to the input via a signal conductor, a ground conductor connectable to ground, a first branch connected to the signal conductor, connected to the ground conductor and comprising a first diode element, a second branch connected to the signal conductor, connected to the ground conductor and comprising a second diode element, and a resistor element between the signal conductor and the ground conductor, wherein one of the first branch and the second branch comprises a voltage source in series with the first diode element or second diode element, wherein along the first branch, from the signal conductor to the ground conductor, an anode of the first diode element is between the signal conductor and a cathode of the first diode element, and along the second branch, from the signal conductor to the ground conductor, a cathode of the second diode element is between the signal conductor and an anode of the first diode element, and wherein, electrically, the first branch and the second branch share both of a first node, at the signal conductor, and a second node, at the ground conductor, and the output is on the first node separate from the second node.

2. The voltage limiter according to claim 1, wherein one of the first branch and the second branch comprises the resistor element or another resistor element in series with the first diode element or second diode element.

3. The voltage limiter according to claim 2, wherein the first branch comprises a first resistor element in series with the first diode element and wherein the second branch comprises a second resistor element in series with the second diode element.

4. The voltage limiter according to claim 1, wherein the first branch comprises a first voltage source in series with the first diode element and wherein the second branch comprises a second voltage source in series with the second diode element.

5. The voltage limiter according to claim 4, wherein the first voltage source and the second voltage source are of opposite polarity.

6. The voltage limiter according to claim 1, further comprising a third branch connected to the signal conductor, connected to the ground conductor and comprising a third diode element.

7. The voltage limiter according to claim 6, further comprising a fourth branch connected to the signal conductor, connected to the ground conductor and comprising a fourth diode element.

8. The voltage limiter according to claim 7, wherein at least one of the third branch and the fourth branch comprises a third resistor element in series with the third diode element or fourth diode element.

9. The voltage limiter according to claim 7, wherein at least one of the third branch and the fourth branch comprises a third voltage source in series with the third diode element or fourth diode element.

10. The voltage limiter according to claim 1, further comprising a zero-order branch connected to the signal conductor and connected to the ground conductor and comprising the resistor element.

11. The voltage limiter according to claim 1, wherein at least one of the branches comprises a switch operable to selectively electrically disrupt an electrical conductivity of the respective branch.

12. A signal receiver comprising:

a signal source, a voltage limiter according to claim 1, wherein the input of the voltage limiter is connected to the signal source, a detector connected to the output of the voltage limiter.

13. The signal receiver according to claim 12, comprising the voltage limiter and further comprising:

a signal analyzer connected to the output, a controller connected to the signal analyzer and connected to the at least one switch, wherein the controller is operable to actuate or operate the at least one switch depending on an output of the signal analyzer.

14. A method of tuning a voltage limiter for a signal receiver, the method comprising the steps of:

providing a voltage limiter according to claim 11, applying an input signal to the input of the voltage limiter, analysing an output signal at the output of the voltage limiter induced by the input signal, selecting or deselecting at least one branch on the basis of the analysis of the output signal, disrupting conductivity of a deselected branch, and establishing conductivity of a selected branch.

15. The voltage limiter according to claim 5, wherein along the first branch, from the signal conductor to the ground conductor, an anode of the first voltage source is between the signal conductor and a cathode of the first voltage source, and wherein along the second branch, from the signal conductor to the ground conductor, a cathode of the second voltage source is between the signal conductor and an anode of the second voltage source.

16. The voltage limiter according to claim 15, wherein the first branch comprises the a first switch operable to selectively electrically disrupt an electrical conductivity of the first branch, and along the first branch, from the signal conductor to the ground conductor, the first switch is between the first voltage source and the ground conductor, and wherein the second branch comprises a second switch operable to selectively electrically disrupt an electrical conductivity of the second branch, and along the second branch, from the signal conductor to the ground conductor, the second switch is between the second voltage source and the ground conductor.

17. The voltage limiter according to claim 10, wherein the resistor element comprises a first terminal and a second terminal, wherein the first terminal is at the first node which is at the signal conductor, and wherein the second terminal is at the second node which is at the ground conductor.

* * * * *